(12) United States Patent
Tsunazawa et al.

(10) Patent No.: US 7,965,054 B2
(45) Date of Patent: Jun. 21, 2011

(54) VACUUM PUMP

(75) Inventors: Yoshio Tsunazawa, Kyoto (JP); Akira Arakawa, Kyoto (JP); Junichiro Kozaki, Kyoto (JP); Masaki Ohfuji, Kyoto (JP)

(73) Assignee: Shimadzu Corporation, Kyoto-shi (JP)

( * ) Notice: Subject to any disclaimer, the term of this patent is extended or adjusted under 35 U.S.C. 154(b) by 837 days.

(21) Appl. No.: 11/878,700

(22) Filed: Jul. 26, 2007

(65) Prior Publication Data

US 2009/0028720 A1    Jan. 29, 2009

(51) Int. Cl.
*G01K 7/38* (2006.01)
*F04B 49/10* (2006.01)

(52) U.S. Cl. ........... 318/471; 417/32; 374/128; 374/129

(58) Field of Classification Search .......... 318/471–473; 374/117, 120, 128, 129, 131, 132, 141, 153, 374/163, 166, 167, 176; 417/32, 63, 423.4
See application file for complete search history.

(56) References Cited

U.S. PATENT DOCUMENTS

| | | | |
|---|---|---|---|
| 3,391,576 A * | 7/1968 | Takami et al. | 374/154 |
| 6,074,088 A * | 6/2000 | Oberschmid et al. | 374/153 |
| 7,417,398 B2 * | 8/2008 | Kozaki et al. | 318/471 |
| 7,564,670 B2 * | 7/2009 | Kozaki et al. | 361/139 |
| 7,575,372 B2 * | 8/2009 | Conrad | 374/163 |
| 2008/0131288 A1 * | 6/2008 | Kozaki | 417/32 |

FOREIGN PATENT DOCUMENTS

| | | |
|---|---|---|
| JP | 49-102390 A | 9/1974 |
| JP | 57-122326 A | 7/1982 |
| JP | 60-104740 U | 7/1985 |
| JP | 7-5051 A | 1/1995 |
| JP | 2000-018189 A | 1/2000 |
| JP | 2001-329991 A | 11/2001 |
| JP | 2003-130524 A | 5/2003 |
| JP | 2003-274625 A | 9/2003 |
| JP | 2004-069462 A | 3/2004 |

* cited by examiner

*Primary Examiner* — Bentsu Ro
(74) *Attorney, Agent, or Firm* — Sughrue Mion, PLLC

(57) ABSTRACT

A vacuum pump capable of accurately detecting a rotor temperature based on a change in permeability of a magnetic material. Two targets are fixed to a nut opposed to a gap sensor. The nut is made of pure iron, and a surface of the nut opposed to the gap sensor serves as a target. The target has a Curie temperature greater than a temperature monitoring range, and each of the targets has a Curie temperature falling within the temperature monitoring range. When the targets become opposed to the gap sensor in turn according to rotation of a rotor, three types of signals are output from the gap sensor. The difference-signal generation means generates a difference signal of each the targets, on the basis of a signal of the target. The difference signal is compared with a reference signal $V_0$ for detecting the Curie temperatures to detect a rotor temperature.

19 Claims, 12 Drawing Sheets

VACUUM PUMP

BACKGROUND OF THE INVENTION

1. Field of the Invention

The present invention relates to a vacuum pump designed to detect a rotor temperature based on a temperature-dependent change in permeability (magnetic permeability) of a magnetic material, and optionally to control the rotor temperature according to the detection result.

2. Description of the Related Art

In a turbo-molecular pump for use in a semiconductor manufacturing apparatus and others, as gas to be evacuated by the turbo-molecular pump has a larger flow rate and/or molecular weight, a rotor temperature becomes higher due to heat generation associated with increased motor-driving power and frictional heat caused by discharge of the gas. Moreover, when gas having a lower thermal conductivity is evacuated, the rotor temperature will become higher. Generally, the rotor temperature becomes higher along with increases in a rotor speed, a flow rate, pressure and/or temperature of evacuation gas, and an air temperature around the pump.

A rotor of the turbo-molecular pump is rotated at a high speed, and thereby a large tensile stress acts thereon due to centrifugal force. Therefore, the rotor is typically made of an aluminum alloy excellent in specific strength. In contrast to this advantage, the aluminum alloy has a relatively low allowable temperature (about 110 to 140° C.) to creep deformation. Thus, it is necessary to constantly monitor a rotor temperature during operation of the pump so as to keep the rotor temperature at the allowable temperature or less.

For this purpose, there has been a technique of detecting a rotor temperature in a non-contact manner by utilizing a phenomenon that a permeability of a magnetic material is largely changed at a Curie temperature thereof (see, for example, Japanese Patent Laid-Open Publication No. 7-5051). Specifically, a ring-shaped ferromagnetic member is attached on an outer peripheral surface of a rotor, and a change in permeability of the ferromagnetic member at a Curie temperature thereof is detected by a coil.

Typically, in a process of detecting a rotor temperature, a signal level from a coil is compared with a threshold as a reference value to determine whether the rotor temperature increases beyond a Curie temperature, based on whether the signal level falls below the threshold. However, although a permeability is largely changed at the Curie point, a difference between a permeability at normal temperature and a permeability at a temperature beyond the Curie point is not so large as compared with the permeability change at the Curie point. Thus, the threshold has to be set within a narrow range to cause difficulty in accurately detecting the rotor temperature.

SUMMARY OF THE INVENTION

In view of the above circumstances, it is an object of the present invention to provide a vacuum pump capable of accurately detecting a rotor temperature based on a change in permeability of a magnetic material.

In order to achieve the above object, as set forth in the appended claim 1, the present invention provides a vacuum pump designed to rotate a rotor relative to a stator so as to evacuate gas, which comprises a plurality of magnetic segments each disposed on the rotor at a position on a circumference having a center on a rotation axis of the rotor, an inductance detection section, calculation-signal generation means, and a temperature detection section. The plurality of magnetic segments includes a first magnetic segment having a Curie temperature falling within a temperature monitoring range of the rotor, and a second magnetic segment having a higher Curie temperature than an upper limit temperature of the temperature monitoring range. The inductance detection section is disposed at a position opposable to the first and second magnetic segments in turn according to rotation of the rotor, and adapted to detect respective permeability changes of the first and second magnetic segments as inductance changes. The calculation signal generation means is adapted to generate a signal calculated based on a detection signal during a period of time when the first magnetic segment is in opposed relation to the inductance detection section, and a detection signal during a period of time when the second magnetic segment is in opposed relation to the inductance detection section. The temperature detection section is adapted to compare a signal level of the calculation signal and a predetermined reference level to detect a temperature of the rotor.

The temperature detection section may be designed to compare the signal level of the calculation signal with a plurality of different reference levels to detect a plurality of temperatures.

Each of the first and second magnetic segments may be formed in such a manner that a length in a direction along the circumference is two times or more greater than a length in a radial direction extending from the rotation axis of the rotor.

The plurality of magnetic segments may further include a third magnetic segment having a higher Curie temperature than the upper limit temperature. In this case, each of the first to third magnetic segments may be adapted to be rotated to a position opposed to the inductance detection section with a gap dimension therebetween which is set such that the gap dimension for the third magnetic segment is less or greater than that for each of the first and second magnetic segments, and the vacuum pump may include a rotation detection section for detecting a rotation cycle of the rotor based on a detection signal during a period of time when the third magnetic segment and the inductance detection section are in opposed relation to each other.

The first magnetic segment may be provided in a plurality number. In this case, the first magnetic segments may be different in Curie temperature, and arranged along the circumference on the rotor.

Any one of the plurality of magnetic segments serves as a retainer member for retaining the remaining magnetic segments to fix them to the rotor.

The vacuum pump may be designed to control the temperature of the rotor based on the detection result of the temperature detection section.

As above, the vacuum pump of the present invention is designed to generate the calculation signal. This makes it possible to provide a wider settable range of the reference revel so as to allow the rotor temperature to be detected with a higher degree of accuracy than ever before.

BRIEF DESCRIPTION OF THE DRAWINGS

FIGS. 2A and 2B illustrate a lower portion of a shaft, wherein FIG. 2A is a perspective view showing a nut 42 and a gap sensor 44, and FIG. 2B is a top plan view of the nut 42, when viewed from the side of the gap sensor 44.

FIGS. 4A and 4B illustrate changes in permeability and inductance with respect to a change of a magnetic segment, wherein FIG. 4A is a graph showing a temperature-dependent change in permeability, and FIG. 4B is a graph showing a temperature-dependent change in inductance.

FIGS. 8A to 8(c) are graphs showing changes of an amplitude signal during a course of the rise in temperature of the targets, wherein FIG. 8A, FIG. 8B and FIG. 8(c) illustrate the changes under the conditions of T<Tc2<Tc3<Tc1, Tc2<T<Tc3<Tc1 and Tc2<Tc3<T<Tc1, respectively.

FIGS. 12A and 12B show a first example of modification, wherein FIG. 12A is a perspective view of a nut 42 and a gap sensor 44, and FIG. 12B is a top plan view of the nut 42, when viewed from the side of the gap sensor 44.

DETAILED DESCRIPTION OF THE EXEMPLARY EMBODIMENTS

Figure 1:
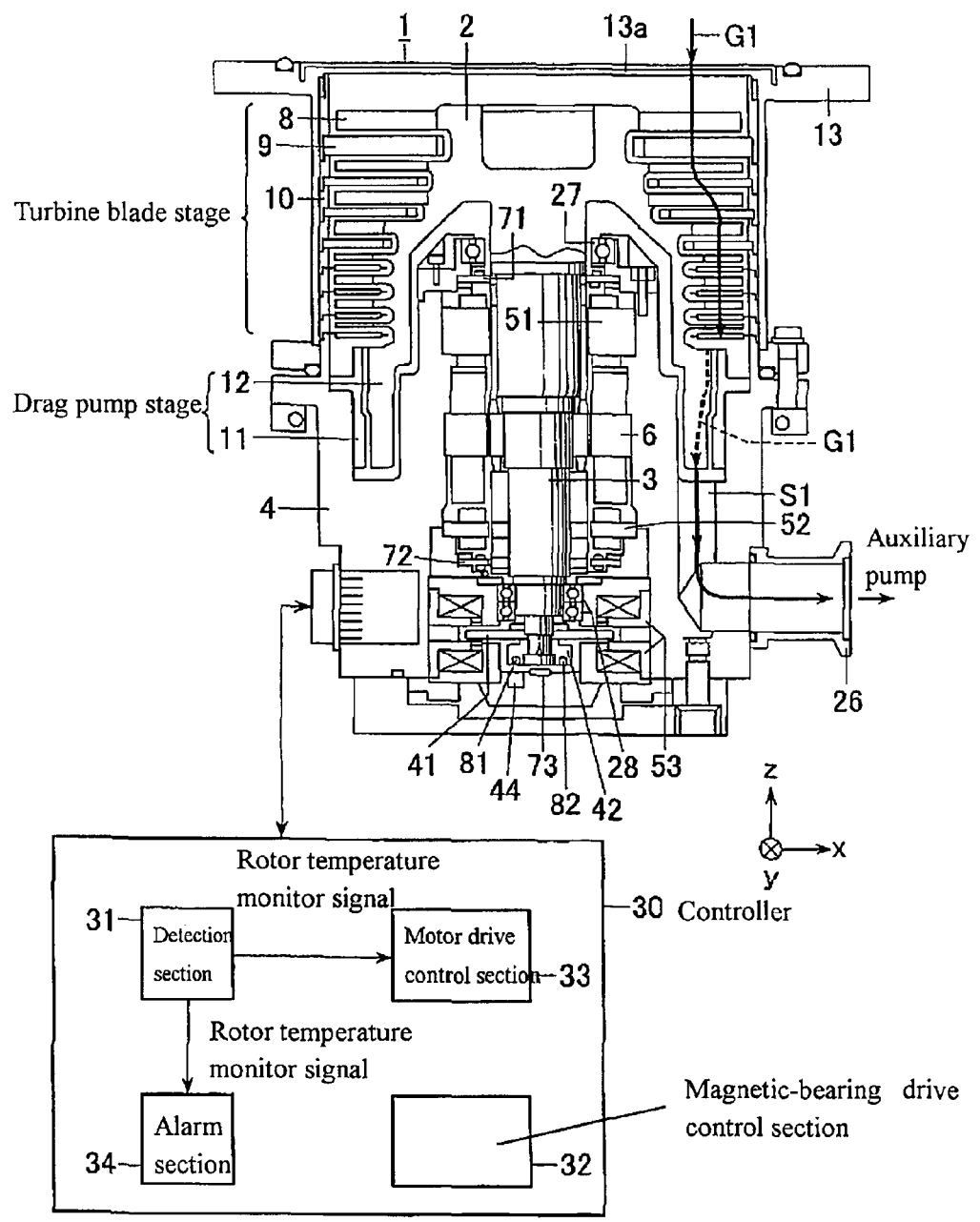
FIG. 1 is a schematic diagram showing a vacuum pump according to one embodiment of the present invention.

With reference to the drawings, an exemplary embodiment of the present invention will now be described. FIG. 1 schematically shows the structure and configuration of a pump body 1 and a controller 30 of a magnetic bearing-type turbo-molecular pump which is a vacuum pump according to one embodiment of the present invention.

The pump body 1 comprises a rotor 2, a shaft 3 fixedly mounting the rotor 2 therein, and a base 4 provided with plurality of electromagnets 51, 52, 53 which are adapted to electromagnetically support the shaft 3. Two radial displacement sensors 71, 72 and an axial displacement sensor 73 are provided in the base 4 to detect a levitated position of the shaft 3. Thus, a 5-axis control-type magnetic bearing is made up of the electromagnets 51, 52 serving as a radial magnetic bearing, the electromagnet 53 serving as an axial magnetic bearing, and the displacement sensor 71 to 73.

The shaft 3 has a lower end provided with a circular-shaped disc 41, and an electromagnet 53 is fixed to the base 4 at a position opposed to the disc 41 from above and below the disc 41. The electromagnet 53 is adapted to attract the disc 41 so as to levitate the shaft 3 in its axial direction. The disc 41 is fixed to the lower end of the shaft 3 by a nut 42. The nut 42 is provided with two magnetic targets 81, 82. A gap sensor 44 is disposed on the side of a stator opposed to the nut 42 at a position opposable to each of the magnetic targets 81, 82. The gap sensor 44 is an inductance-type gap sensor adapted to detect, as inductance changes, respective permeability changes of the targets 81, 82 when a rotor temperature is increased up to an allowable temperature or more as inductance changes, as described in detail later.

The rotor 2 is formed with a plurality of rotor blades 8 arranged in a direction of a rotation axis thereof in a multi-stage manner. A plurality of stator blades 9 are disposed between the vertically adjacent pairs of rotor blades 8, respectively. A turbine blade stage of the pump body 1 is made up of the rotor blades 8 and the stator blades 9. Each of the stator blades 9 is retained by a spacer 10 in a vertically sandwiched manner. In addition to the function of retaining the stator blades 9, the spacer 10 has a function of keeping a gap between the adjacent stator blades 9 at a predetermined distance.

A threaded stator 11 is disposed in a subsequent stage relative to the stator blades 9 (on a lower side of FIG. 1), to make up a drag pump stage, and a certain gap is defined between an inner peripheral surface of the threaded stator 11 and a cylindrical portion 12 of the rotor 2. The rotor 2 and the stator blades 9 retained by the spacer 10 are housed in a casing 13 formed with an inlet port 13a. When the shaft 3 is supported by the electromagnets 51 to 53 in a non-contact manner, and drivenly rotated by a motor 6, gas on the side of the inlet port 12a is discharged to a back-pressure side (space S1) as indicated by the arrow G. Then, the gas discharged to the back-pressure side is exhausted by an auxiliary pump connected to an outlet port 26.

The turbo-molecular pump body 1 is drive-controlled by the controller 30. The controller 3 comprises a magnetic-bearing drive control section 32 for drive-controlling the magnetic bearing, and a motor drive control section 33 for drive-controlling the motor 6. The controller 3 further includes a detection section 31 for detecting whether respective permeabilities of the targets 81, 82 are changed, based on an output signal of the gap sensor 44, and an alarm section 34.

In response to an input of the output signal of the gap sensor 44, the detection section 31 is operable to output a rotor-temperature monitor signal to the motor drive control section 33 and the alarm section 34. It is understood that the controller 3 may have an output terminal for allowing the rotor-temperature monitor signal to be output to the outside thereof. The alarm section 34 serves as an alarm means to present alarm information about abnormality in the rotor temperature or the like, to an operator, and may comprise a speaker adapted to generate an audio alarm, or a display or indicator adapted to display or indicate a visual alarm.

Figure 2A:
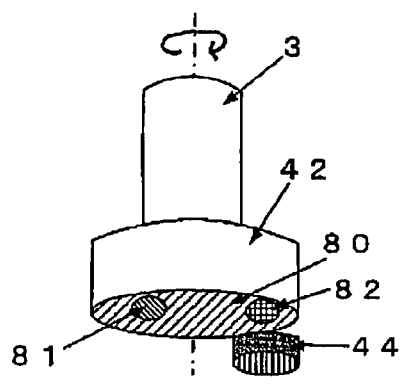
Figure 2B:
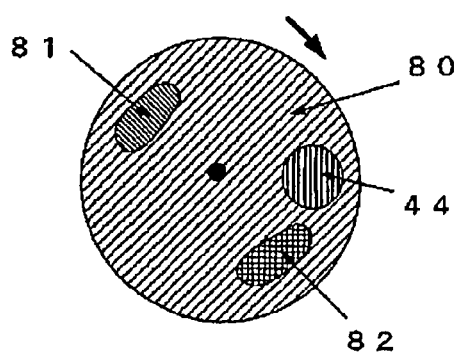

FIG. 2A is a perspective view showing the nut 42 at the lower end of the shaft, and the gap sensor 44, and FIG. 2B is a top plan view of the nut 42, when viewed from the side of the gap sensor 44. The magnetic targets 81, 82 are mounted in a bottom surface of the nut 42 by means of bonding or shrinkage fitting. While a centrifugal force will act on the targets 81, 82 when the nut 42 is rotated at a high speed together with the shaft 3, the targets 81, 82 may be disposed adjacent to the rotation axis at a lower edge of the shaft 3 to suppress an influence of the centrifugal force. Particularly, in the targets 81, 82 mounted through shrinkage fitting, when the nut 42 shrinks due to cooling after heating during a shrinkage-fitting treatment, a compressive stress is applied to the targets 81, 82 to provide an enhanced effect of suppressing the influence of the centrifugal force.

A material having a Curie temperature falling within a temperature range to be subjected to detection, i.e., a temperature monitoring range, is selected for the targets 81, 82. Typically, the material to be selected may include a material having a Curie temperature of 110 to 140° C. which is an allowable maximum temperature to creep deformation (hereinafter referred to simply as allowable temperature) in an aluminum material for use in the rotor blades 8 (see FIG. 1), for example, a ferrite material. Upper and lower limits of the temperature monitoring range are set, respectively, at values above and below the allowable temperature by about 20° C.

Each of the targets 81, 82 is mounted to have an exposed surface which is flush with the bottom surface of the nut 42, and a gap dimension, i.e., distance, between the bottom surface of the nut 42 and the gap sensor 44 is set at about 1 mm. In this embodiment, pure iron which is a magnetic material, is used as a material of the nut 42. A Curie temperature of the pure iron is sufficiently greater than the allowable temperature of 110 to 140° C. as a focus of the discussion, and is on a higher temperature side relative to the temperature monitoring range. The bottom surface 80 of the pure-iron nut 42 will hereinafter be referred to as "target 80". In the above structure, when the nut 42 is rotated relative to the gap sensor 44 in a direction indicated by the arrow in FIG. 2B according to rotation of the shaft 3 fixedly mounting the rotor 2 therein, the gap sensor 44 will become opposed to the target 80, the target 81, the target 82 and the target 80, in this order by turns, to output signals corresponding to respective permeabilities of the targets 80 to 82.

Operation of Detecting Inductance Change

Figure 3:
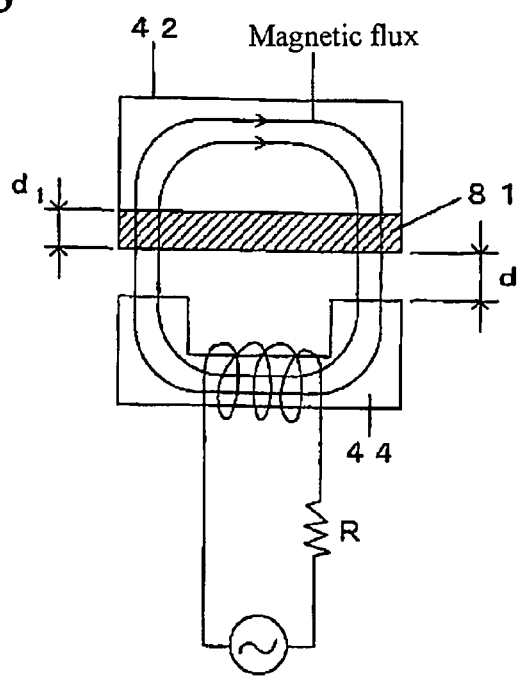
FIG. 3 is a schematic diagram for explaining an inductance change of the gap sensor 44.

FIG. 3 is a schematic diagram for explaining an inductance change of the gap sensor 44, which shows a magnetic circuit formed of the gap sensor 44 and the target 81. The gap sensor 44 has a structure in which a coil is wound around a core formed of a material having a large permeability, such as silicon steel sheet. A high-frequency is applied as a carrier wave to the coil of the gap sensor 44, so that a high-frequency magnetic field is formed from the gap sensor 44 toward the target 81.

The target 81 is made of a material having a Curie temperature Tc which is approximately equal to or close to the allowable temperature Tmax of the rotor 2. In this embodiment, the rotor 2 is made of a material in which creep deformation occurs at a temperature equal to or greater than the allowable temperature Tmax. For example, when this material is aluminum, the allowable temperature Tmax is in the range of about 110 to 140° C. A magnetic material having a Curie temperature of about 120° C. includes nickel-zinc ferrite and manganese-zinc ferrite.

Figure 4A:
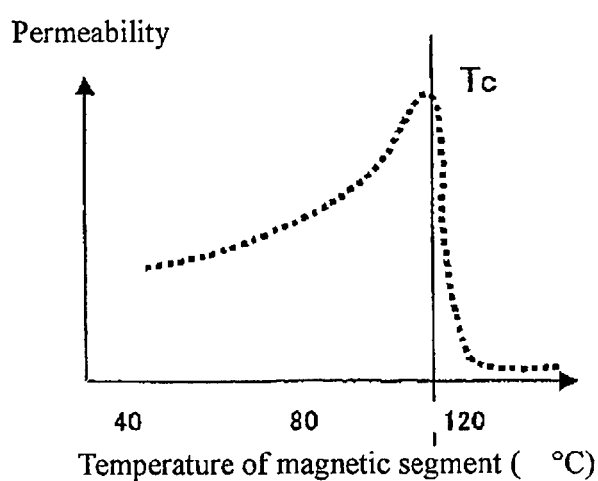

As shown in FIG. 4A, when a temperature of the target 81 is increased along with an increase in the rotor temperature, to exceed the Curie temperature Tc, the permeability of the target 81 is sharply reduced to about a magnetic permeability of vacuum (vacuum permeability) $\mu_0$. FIG. 4A shows a permeability change in a ferrite material which is a typical magnetic material. As seen in FIG. 4A, a permeability at normal temperature is less than that around the Curie temperature, and increased along with an increase in temperature. Then, when the temperature is increased beyond the Curie temperature, the permeability is sharply reduced. If the permeability of the target 81 is changed in a magnetic field, an inductance of the gap sensor 44 will be changed. Consequently, the carrier wave is amplitude-modified. Thus, the amplitude-modified carrier wave output from the gap sensor can be subjected to wave detection and rectification so as to detect a change in signal corresponding to the change in permeability.

A magnetic material, such as a ferrite material, is used in the core of the gap sensor 44. If a permeability of this core material is sufficiently larger than a permeability of an air gap (see FIG. 3) to an extent allowing the permeability of the air gap to be negligible, and a leakage flux is negligible, a relationship of the inductance L and dimensions d, $d_1$ (see FIG. 3) can be approximately expressed as the following Formula (1):

$$L=N^2/\{d_1/(d_1 \cdot S)+d/(\mu_0 \cdot S)\} \quad (1)$$

wherein: N is the number of turns of the coil; S is a sectional area of the core opposed to the target 81; d is the air gap; $d_1$ is a thickness of the target 81; and $\mu_1$ is the permeability of the target 81, wherein the permeability of the air gap is equal to the vacuum permeability $\mu_0$.

In the state when the rotor temperature is less than the Curie temperature Tc, the permeability of the target 81 is sufficiently greater than the vacuum permeability. Thus, as compared with $d/(\mu_0 \cdot S)$, $d_1/(\mu_1 \cdot S)$ becomes negligibly small, and Formula (1) can be approximately expressed as the following Formula (2):

$$L=N^2 \cdot \mu_0 \cdot S/d \quad (2)$$

In the state when the rotor temperature is increased up to the Curie temperature Tc or more, $\mu_1$ becomes approximately equal to $\mu_0$. Thus, in this case, Formula (1) can be expressed as the following Formula (3):

$$L=N^2 \cdot \mu_0 \cdot S/(d+d_1) \quad (3)$$

This means that the air gap is changed from d to $(d+d_1)$, and the inductance of the gap sensor 44 will be changed accordingly. This inductance change can be detected by the detection section 31 of the controller 31 to monitor whether the rotor temperature becomes equal to or greater than the Curie temperature Tc.

Rotor-Temperature Monitor Signal

Figure 5:
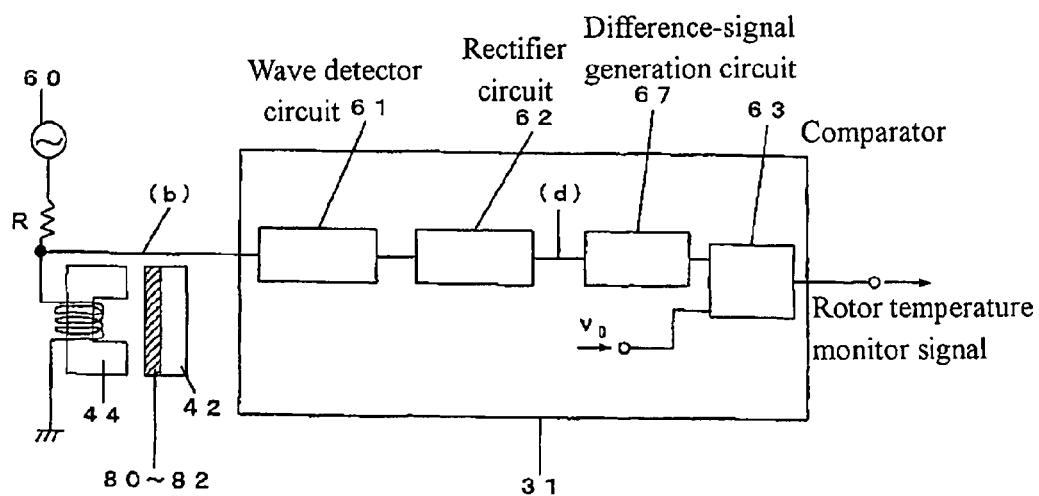
FIG. 5 is a block diagram for explaining a detection section 31.

FIG. 5 is a block diagram of the detection section 31. An output (carrier wave having a frequency of several ten kHz) of an AC oscillator 60 is applied to the gap sensor 44 through a resistor. The following description shows an example in which a difference signal is used as a calculation signal. The detection section 31 comprises a wave detector circuit 61, a rectifier circuit 62, a difference-signal generation circuit 67 and a comparator 63. The comparator 63 is operable to compare a signal from the difference-signal generation circuit 67 with a reference signal $v_0$ (a signal corresponding to an after-mentioned threshold), and output the comparison result as the rotor-temperature monitor signal.

Figure 6A:
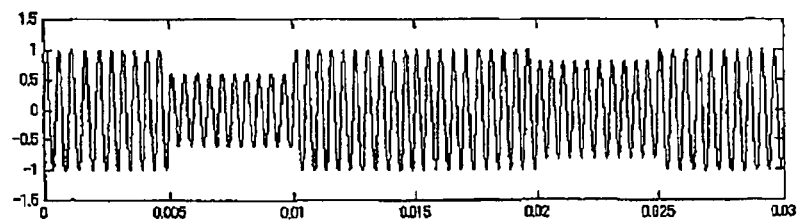
FIG. 6A is a graph showing a typical example of an amplitude-modulated signal output from the gap sensor 44.
Figure 6B:
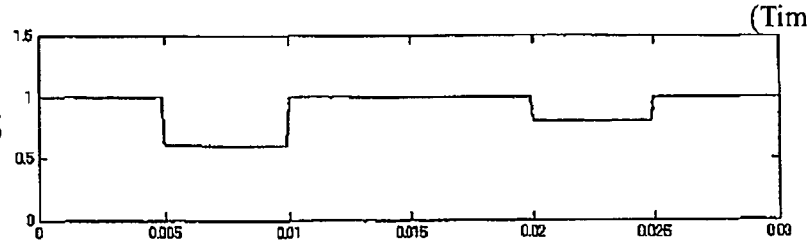
FIG. 6B is a graph showing a signal output from a rectifier circuit 62.

The gap sensor 44 becomes opposed to the three types of targets 80 to 82 in turn according to the rotation of the rotor 2, as mentioned above. Thus, the inductance of the gap sensor 44 has three types of values per 360-degree rotation. FIG. 6A shows a typical example of the amplitude-modulated signal appearing at a position indicated by the code (b) in FIG. 5. The original AC having a frequency of several ten kHz is amplitude-modulated by the inductance of the gap sensor 44, and formed as an AC signal in which three types of amplitude levels appear during a 360-degree rotation. After passing through the wave detector circuit 61 and the rectifier circuit 62, the AC signal appears as a signal as shown in FIG. 6B at a position indicated by the code (d). The signal illustrated in FIG. 6B is formed by extracting amplitude from the signal illustrated in FIG. 6A.

In a process of detecting the rotor temperature based on a Curie temperature of a magnetic material, it is necessary to take account of the following points. Firstly, the inductance of the detection section is largely changed by even a slight variation in a gap dimension between the detection coil and the target, to cause difficulty in adequately setting a threshold level for determining the Curie point. A factor causing the variation in the gap dimension includes a scatter in the gap dimension during an assembling operation, a change over time in the gap dimension, and a displacement of the rotor axis in a thrust direction due to changes in the rotor temperature. The variation in the gap dimension caused by the above factors will preclude setting of a stable threshold.

Figure 4B:
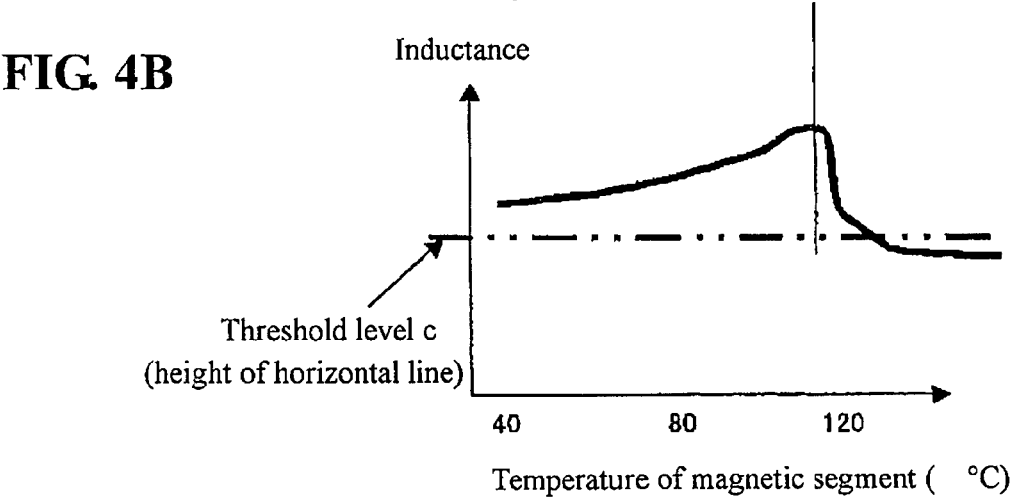

The permeability change illustrated in FIG. 4A is converted to the inductance change by the coil of the gap sensor 44, as mentioned above. FIG. 4B shows one example of the inductance change. While the inductance is changed in a similar pattern to that of the permeability change, a rate of change is slightly reduced as compared with that of the permeability, in such a manner as to have a vertically-compressed pattern. As the result of this analysis, it has been proven that a difference between a level of inductance in a temperature region beyond the Curie temperature where the inductance is sharply lowered, and a level of inductance at normal temperature (around 40° C.) is small.

Fundamentally, it is desirable that only a sharply-falling inductance curve in the temperature region adjacent to the Curie temperature is output, and a horizontal line at the threshold level intersects with the sharply-falling inductance curve in the temperature region adjacent to the Curie temperature. In reality, when a typical magnetic martial is used, the inductance is lowered in the normal temperature region, as shown in FIG. 4B. Based on this characteristic curve, it has also been proven that, if the threshold level is lowered to avoid intersecting with the inductance curve in the normal temperature region, the horizontal line, i.e., threshold line, will intersect with an inductance curve in a temperature region far beyond the Curie temperature where the inductance curve has a gentle slope, to cause a problem about deterioration in accuracy of the temperature detection.

Figure 7:
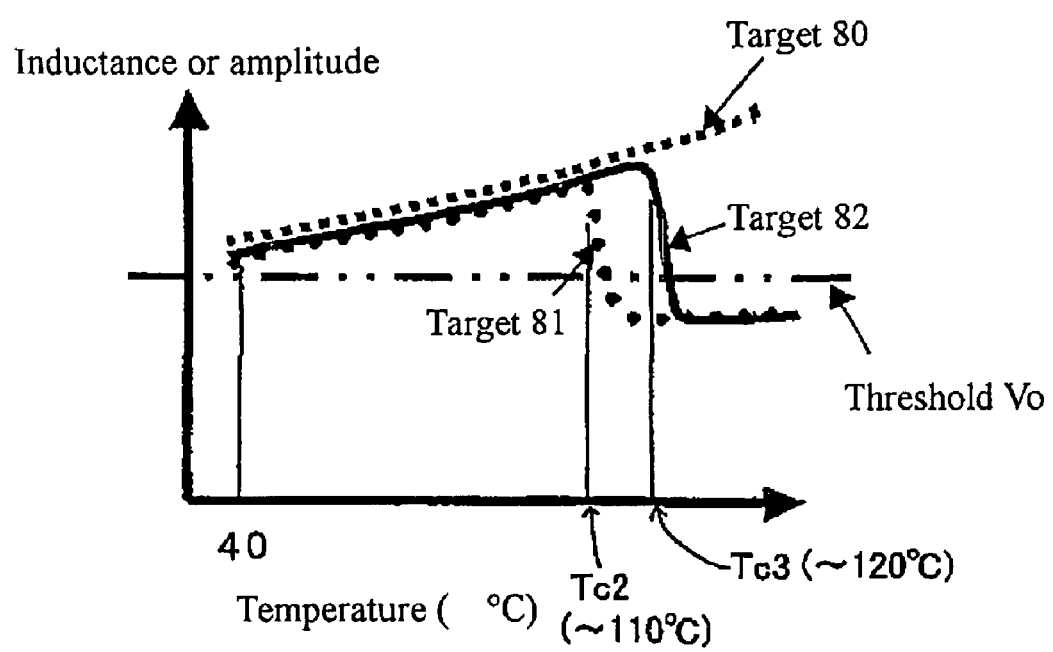
FIG. 7 is a graph showing respective temperature-dependent changes in inductance associated with targets 80 to 82.

FIG. 7 shows respective temperature-dependent changes in inductance associated with the three types of targets 80 to 82, wherein the vertical axis represents the inductance as with FIG. 4B. This vertical axis may be regarded as the amplitude of the detection signal, because the inductance of the gap sensor 44 corresponds to the amplitude of the detection signal. That is, the vertical axis in FIG. 7 represents the inductance or the amplitude of the detection signal.

As mentioned above, the target 80 is the bottom surface of the nut 42. A Curie temperature Tc1 of the target 80 made of pure iron is sufficiently greater than respective Curie temperatures Tc2, Tc3 of the targets 81, 82, and the inductance is linearly increased in a temperature region illustrated in FIG. 7 (in a temperature region below the Curie temperature Tc1). The respective ferrite materials of the targets 81, 82 are selected to allow the Curie temperatures Tc2, Tc3 to be about 110° C. and about 120° C., respectively. Thus, as to the target 81, the inductance is linearly increased in a temperature region of the normal temperature to about 110° C., and then sharply lowered when the temperature is increased beyond the Curie temperatures Tc2 of about 110° C. As to the target 82, the inductance is sharply lowered when the temperature is increased beyond the Curie temperatures Tc3 of about 120° C. In a low temperature region of 100° C. or less, the inductance is increased in substantially the same pattern irrespective of the difference in magnetic material of the targets 80 to 82.

As mentioned above, the carrier wave having a frequency of several ten kHz is input from the AC oscillator 60 illustrated in FIG. 5 into the gap sensor 44 through the resistor. The gap sensor 44 becomes opposed to the three types of targets 80 to 82 different in permeability, in turn according to the rotation of the nut 42. Thus, the inductance of the gap sensor 44 has three types of values per 360-degree rotation of the nut 42. Specifically, the original AC having a frequency of several ten kHz is amplitude-modulated by the inductance of the gap sensor 44, and then the amplitude-modulated signal appears as an AC signal having three types of amplitude levels per 360-degree rotation, at the position (b) in the block diagram illustrated in FIG. 5.

An amplitude Vout of the signal appearing at the position (b) can be expressed as the following Formula (4):

$$V_{out} = \frac{2\pi f L}{\sqrt{(2\pi f L)^2 + R^2}} \quad (4)$$

wherein: f is a frequency of the carrier wave from the AC oscillator 60; Vin is an amplitude of the carrier wave; L is the inductance of the gap sensor 44; and R is a resistance of the resistor.

In Formula (4), R is generally a constant value. Thus, the amplitude Vout becomes larger as the inductance L becomes higher. Thus, in the following description, the level of amplitude Vout will be used in place of the level of inductance L.

Figure 8A:
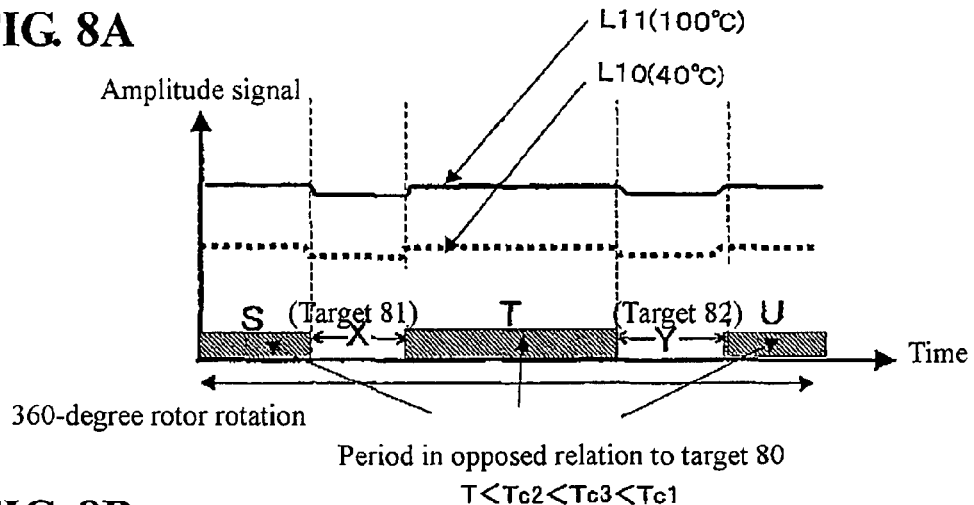
Figure 8B:
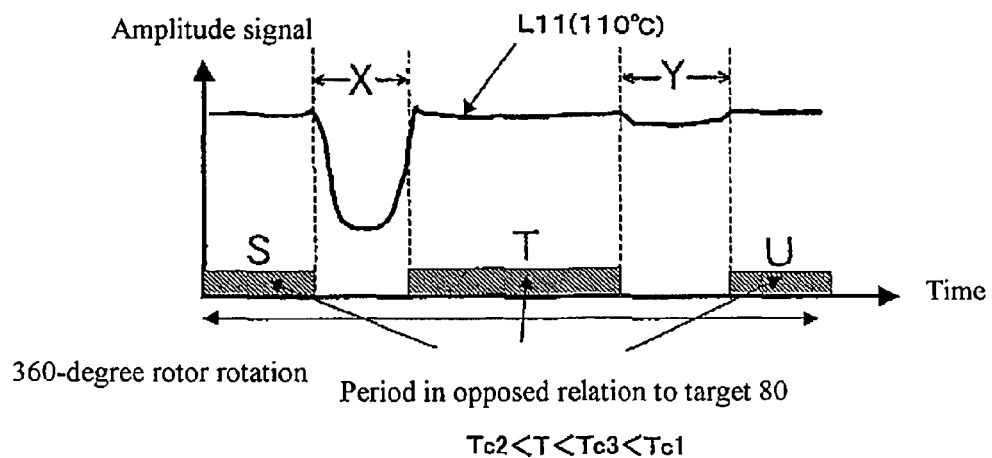
Figure 8C:
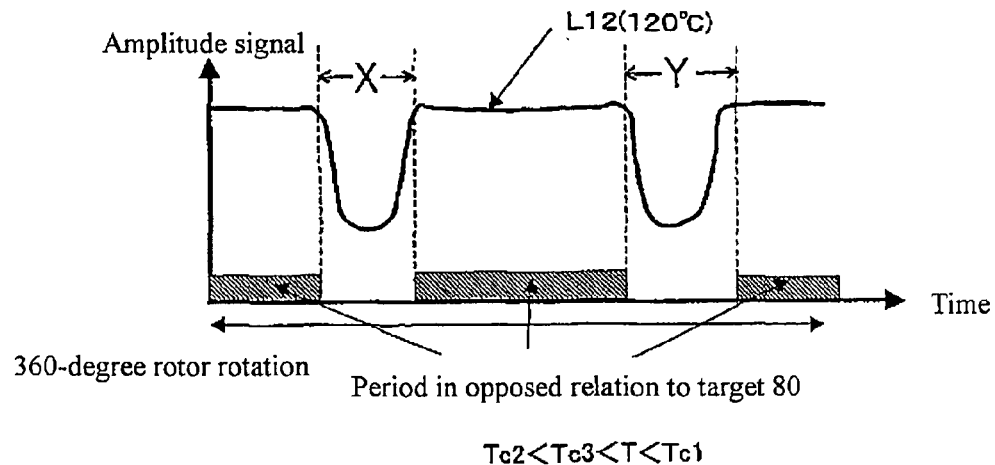

Further, the following description will be made based on a rectified amplitude signal equivalent to that in FIG. 6B. FIGS. 8A to 8C show changes of an amplitude signal during a course of the rise in target temperature T (i.e., a common temperature T of the targets 80, 81, 82) (changes of the amplitude signal during a 360-degree rotation of the nut 42). The respective Curie temperatures Tc1, Tc2, Tc3 of the targets 80, 81, 82 are set in the following relation: Tc2<Tc3<Tc1. FIG. 8A shows the changes under the condition of T<Tc2<Tc3<Tc1. FIG. 8B shows the changes under the condition of Tc2<T<Tc3<Tc1. FIG. 8C shows the changes under the condition of Tc2<Tc3<T<Tc1.

Among output signals during a 360-degree rotation of the nut 42, the signal in each of three periods S, T, U is an output signal during a period of time when the gap sensor 44 is in opposed relation to the target 80. The signal in a period X is an output signal output during a period where the gap sensor 44 is in opposed relation to the target 81, and the signal in a period Y is an output signal during a period of time when the gap sensor 44 is in opposed relation to the target 82.

In FIG. 8A, a curve L10 indicated by the dotted line shows an amplitude signal under the condition of T=40° C., and a curve L11 indicated by the solid line shows an amplitude signal under the condition of T=100° C. The target temperature T in FIG. 8A is less than any of the Curie temperatures Tc1, Tc2, Tc3 of the targets 80, 81, 82, and thereby the signals in the periods S, T, U and the signals in the periods X, Y have approximately the same amplitude. A distinctive characteristic in this temperature region is that the inductance during a period of time when each of the targets 80 to 81 is in opposed relation to the gap sensor 44 is linearly increased along with an increase in temperature, and thereby an overall level of the amplitude signal is increased along with an increase in temperature, as shown in FIG. 7.

In the temperature region illustrated in FIG. 8B, the target temperature T exceeds the Curie temperature Tc2 of the target 81, and thereby the signal in the period X where the gap sensor 44 is in opposed relation to the target 81 is sharply lowered. The signal level in each of the remaining periods is increased, because of the increased temperature.

In the temperature region illustrated in FIG. 8C, the target temperature T exceeds both the Curie temperatures Tc2, Tc3 of the targets 81, 82, and thereby each of the signals in the period X, Y where the gap sensor 44 is in opposed relation to the respective targets 81, 82 is sharply lowered. In this region, each of the signal levels in the periods S, T, U is increased as compared with those in FIG. 8B, because of T<Tc1.

The signal changes in FIGS. 8A to 8C correspond to that the curves in FIG. 7. Specifically, based on the signals in FIG. 8A to 8C, any one of the signals in the periods S, T, U is extracted or these signals are averaged, for the target 80. Further, the signal in the period X is picked up for the target 81, and the signal in the period Y is picked up for the target 82. A temperature-dependent change pattern of the amplitude signal to be obtained from these signals will come down to the curves in FIG. 7. Then, the determination on whether the temperature of the target 81 or the target 82 exceeds the Curie temperature thereof is made by comparing the amplitude with the threshold $v_0$ in FIG. 7. While it is necessary to set the threshold $v_0$ without overlap with the amplitude curve in the low temperature region, such an operation inevitably causes the aforementioned problem about a narrow settable range of the threshold, unless effective measures are taken.

This problem is caused by the phenomenon that a permeability of a magnetic material is changed to a sufficiently large extent in the range of normal temperature to a Curie temperature thereof, as shown in FIG. 4A. With a view to preventing this problem, in this embodiment, the difference-signal generation section 67 is provided in the subsequent stage of the rectifier circuit 62 as shown in FIG. 5. Specifically, the difference-signal generation section 67 is operable to calculate a signal (difference signal) by subtracting a signal of the target 80 used as a reference signal from each of signals of the targets 81, 82, and input the difference signal into the comparator 63. Then, the comparator 63 is operable to compare the difference signal with the threshold $v_0$, and output the comparison result as the rotor-temperature monitor signal to the motor drive control section 33 and the alarm section 34.

Figure 9:
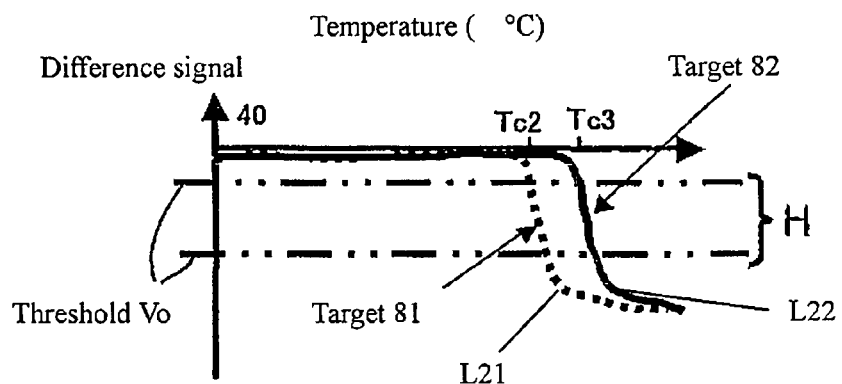
FIG. 9 is a graph showing respective difference signals of the targets 81, 82.

For example, the difference-signal generation section 67 may comprise a signal hold circuit and a differential circuit. In this case, the signal hold circuit is operable to extract signals in respective periods associated with the three targets 80 to 82, from an output signal of the rectifier circuit 62, and send the extracted signals to the differential circuit. The differential circuit is operable to generate a difference signal based on the picked-up signals. FIG. 9 shows respective difference signals of the targets 81, 82 after subtraction of the reference signal. A curve L21 indicated by the dotted line shows the difference signal of the target 81, and a curve L22 indicated by the solid line shows the difference signal of the target 82. In each of the curves 21, 22 based on these difference signals, a slope in the low temperature region below the Curie temperature becomes horizontal. This makes it possible to ensure a wider settable range of the threshold $v_0$ as shown in FIG. 9.

Figure 10:
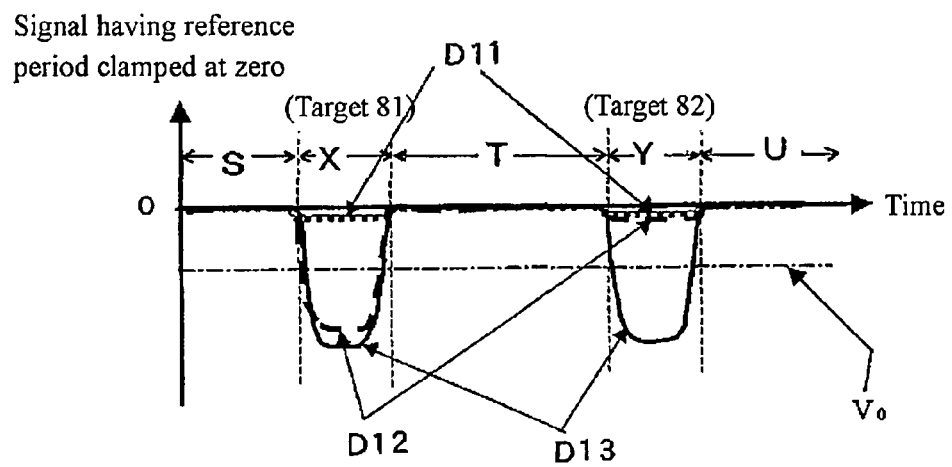
FIG. 10 is a graph showing a signal in one example using a zero clamp circuit.

Alternatively, as shown in FIG. 10, the difference signal may be generated by passing respective signals associated with the targets 81 to 82 through a zero clamp circuit adapted to keep a signal level in each of the periods (periods S, T, U in FIG. 8) of the reference signals of the target 80 at a zero level, and then extracting respective signals in the period X and the period Y through a signal hold circuit. FIG. 10 shows a signal in the above example using the so-called "zero clamp circuit" adapted to allow a signal to have a zero level (to be superimposed on a zero-level reference line) through parallel displacement thereof.

In the example illustrated in FIG. 10, the reference signals of the target 80 are subtracted to completely cancel temperature changes of the target 80, and only signal changes at the Curie temperatures appear on a negative side, as indicated by the codes D12, D13. Thus, a stable threshold level can be set by extracting the negative signals of the target 81 and the target 82 corresponding, respectively, to the period X and the period Y, and then setting a threshold for detecting each of the Curie temperatures of the targets 81, 82 based on the extracted signals, as the reference voltage $v_0$ of the comparator. Curves corresponding to the curves L10, L11 in FIG. 8A are almost superimposed on the zero-level reference line in the periods X, Y indicated by the code D11 (indicated by the dotted lines).

Alternatively, the signals illustrated in FIGS. 8A to 8C may be converted to digital signals through an AD converter capable of AD-converting at a sufficiently high speed to allow the difference signal to be calculated based on the digital signals so as to process the threshold in a digital manner. The technique for the subtraction using the signals of the target 80 as the reference signals entirely belongs to a conventional processing using an electric circuit, and therefore its detailed description will be omitted therein.

The above embodiment has been described based on one example using three magnetic segments (or three types of magnetic materials) 80 to 82. As can be understood from the above description, an essential requirement for detecting the rotor temperature is satisfied by comprising the target 80 serving as a reference magnetic segment and the target 81 serving as a temperature-detecting magnetic segment. In this case, the rotor temperature will be detected based on one Curie temperature.

The aforementioned techniques are intended to correct an amplitude change due to a temperature change, in a low temperature region below a Curie temperature, based on the reference signals of the target 80 so as to eliminate an adverse effect on the entire characteristic of the amplitude change. This correction is achieved by employing a time-division detection process of extracting a signal detected during a period of time when each of the targets 80 to 82 is passing through a position opposed to the gap sensor 44.

Figure 16:
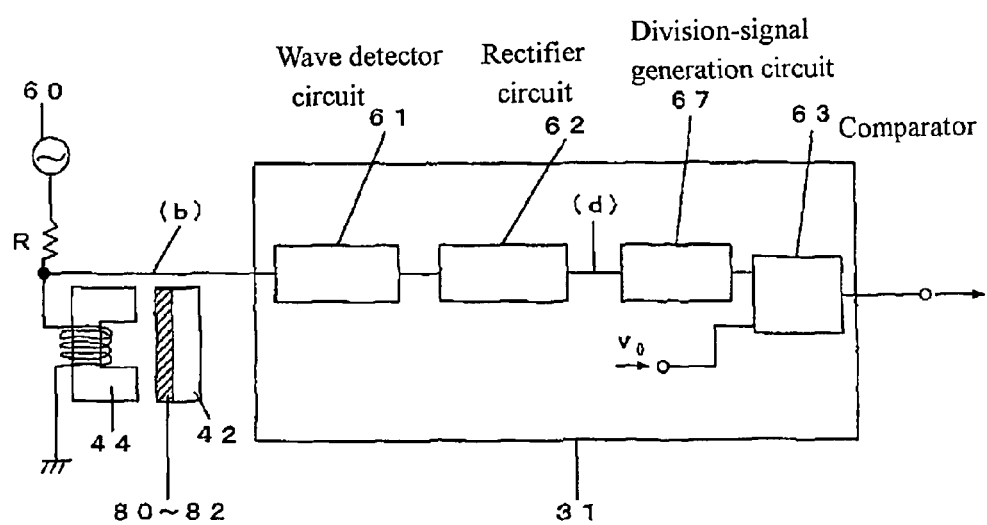
FIG. 16 is a block diagram for explaining the detection section using a division signal.

The above embodiment shows an example using a difference signal as a calculation signal, but a division signal may be used as the difference signal. In this case, as shown in FIG. 16, a division-signal generation circuit 67 is provided in the subsequent stage of the rectifier circuit 62. The division-signal generation circuit 67 calculates a signal (division signal) such that each of signals of the targets 81 and 82 is divided by a signal of the target 80 used as a reference signal and inputs the division signal into the comparator 63. Then, the comparator 63 compares the division signal with a threshold value, and outputs a comparison result signal as a rotor-temperature monitor signal to the motor drive control section 33 and the alarm section.

Figure 17:
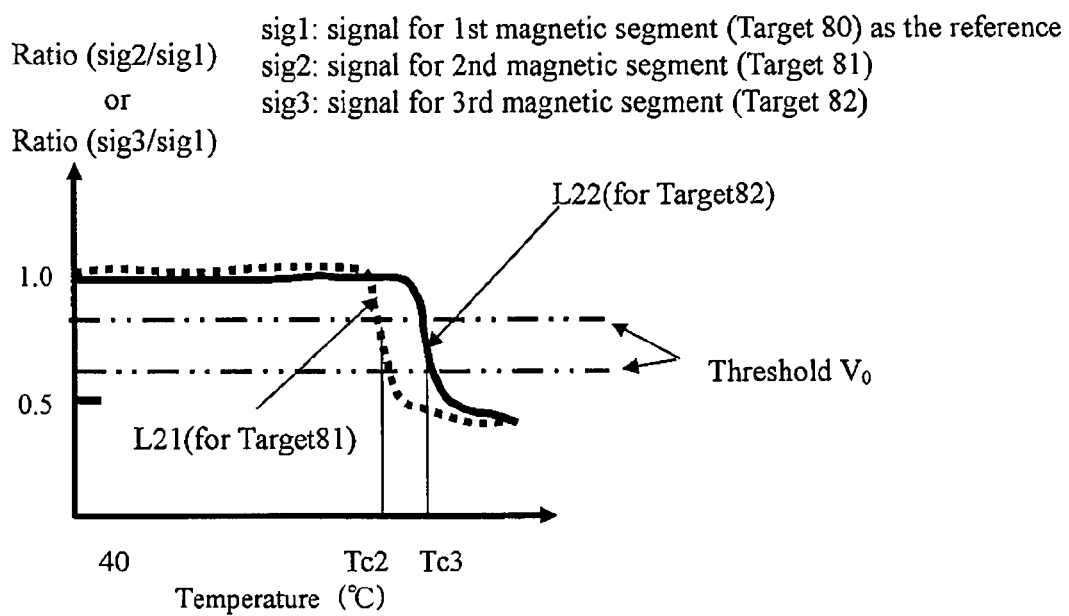
FIG. 17 is a graph showing the temperature dependence of respective division signals of the target 81, 82 calculated based on the reference signal of the target 80.

FIG. 17 explains the temperature dependence of the above mentioned 'division signal' in place of the 'difference signal' that is corresponding to the curve of FIG. 9. In FIG. 17, the ratio (sig2/sig1 or sig3/sig1) remains nearly unity at lower temperature than the temperature Tc2 or Tc3 and it decreases (to typically 0.5 for example) when the temperature exceeds Tc2 or Tc3. The threshold voltage $V_0$ can be selectable at such a value as 0.8 etc. The use of the division signal may be advantageous in case when the gaps between the gap sensor and the targets tend to vary during the pump operation, because stable detection can be expected against signal change due to gap-variation by taking the ratio.

Figure 18:
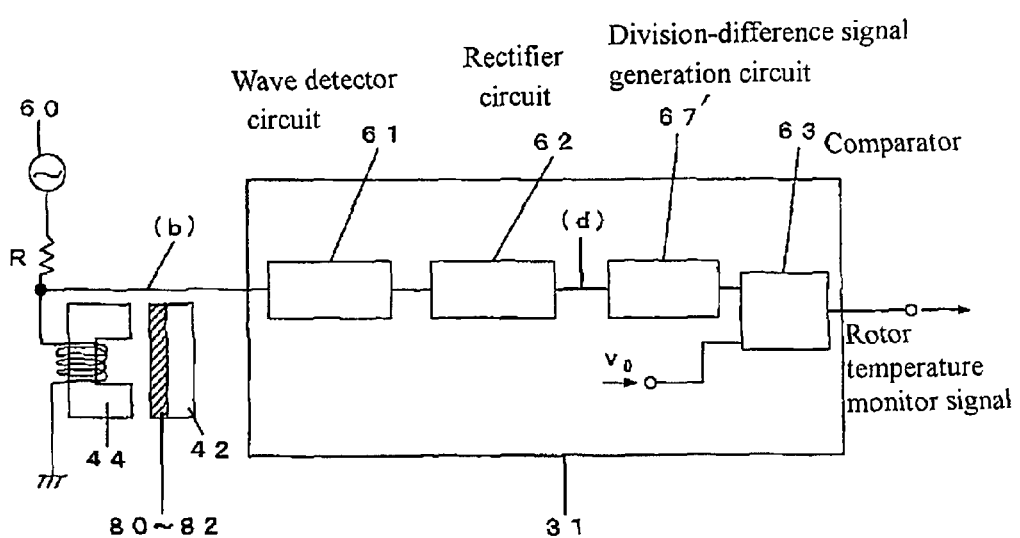
FIG. 18 is a block diagram for explaining the detection section using a division signal and a difference signal.

Alternatively, the division signal and the difference signal may be combined. In this case, as shown in FIG. 18 a division-difference signal generation circuit 67' for combining the division signal and the difference signal is provided in the subsequent stage of the rectifier circuit 62. The division-difference signal generation circuit 67' calculates a signal (division signal) such that each of signals of the targets 81 and 82 is divided by the signal of the target 80 used as a reference signal, and subtracts the reference signal from the division signal. Then, the circuit inputs the resulting signal into the comparator 63. The comparator 63 compares the signal with the threshold. This calculation method makes it possible to correct a permeability change at normal temperature and to ensure a wider settable range of the threshold.

Shape of Target

Figure 11A:
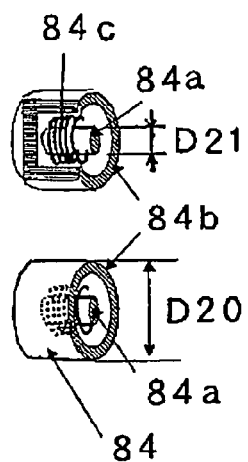
FIG. 11A is a schematic diagram showing sectional and external shapes of a bi-cylindrical core 84.
Figure 11B:
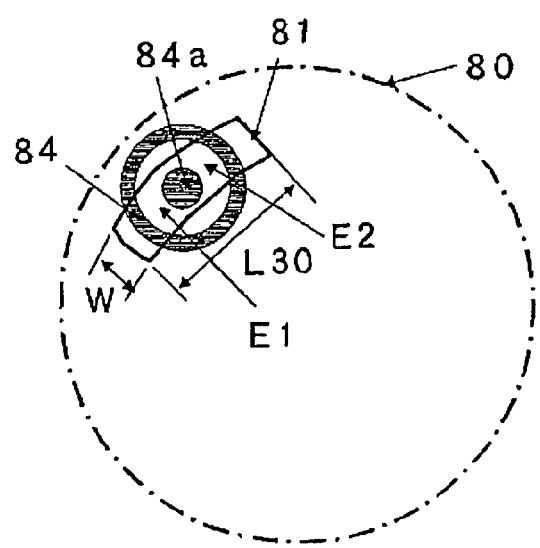
FIG. 11B is a schematic diagram showing a relationship between respective shapes of the bi-cylindrical core 84 and the target 81.

An optimal shape for each of the targets 81, 82 will be described below. A shape of the core of the gap sensor 44 may include a simple C shape, as shown in FIG. 3, and a bi-cylindrical shape as shown in FIG. 11A wherein a coil 84c is wound around an inner core 84a of a bi-cylindrical core 84. FIG. 11B shows a relationship between respective shapes of the bi-cylindrical core 84 and the target 81.

In FIGS. 11A and 11B, when a temperature of the target 81 is increased beyond the Curie temperature Tc2, the permeability of the target 82 becomes a vacuum permeability. Due to the vacuum permeability of the target 81 mounted in the pure-iron target 80, a magnetically hollow or open hole is created in an area of the target 81. Thus, a magnetic circuit of the coil 84c is opened, and an inductance of the bi-cylindrical core 84 is sharply lowered. In this case, both gaps E1, E2 between the inner core 84a and an outer core 84b of the coil 84c have to be magnetically opened, i.e., insulated. If either one of the gaps E1, E2 is shortcut in the magnetic circuit through the pure-iron region (target 80), the inductance will not be adequately lowered even after the target temperature is increased beyond the Curie temperature Tc2.

From this point of view, the target 81 preferably has an elongated shape along a circumferential direction of the target 80. A length L 30 of the target 81 in the circumferential direction has to be set at a value greater than a diameter D20 of the bi-cylindrical core 84. A width W of the target 81 may be set at a value slightly less than the diameter D20 of the bi-cylindrical core 84 and slightly greater than a diameter D21 of the inner core 84a. The diameter D20 of the bi-cylindrical core 84 has to be set at a relatively large value to an extent allowing detection sensitivity to be adequately ensured. In practice, it is preferable that the length L is two times or more greater than the width W. This shape having a relatively large length L30 and a relatively narrow width W allows a diameter of the target 80 to be reduced so as to contribute to both reduction in size and enhancement of resistance to centrifugal force.

In some cases, the nut 42 mounting the targets 81, 82 therein can have a temperature different from that of the aluminum-alloy rotor blade 8 (see FIG. 1) to be constantly monitored. In this case, a correlation between respective temperatures of the rotor blade 8 and the nut 42, and optionally a relation between the nut 42 and each of a motor current and the base 4, in terms of temperature, may be measured in advance, so as to estimate the temperature of rotor blade 8 from the temperature of the nut 42 mounting the targets 81, 82 therein.

FIRST EXAMPLE OF MODIFICATION

Figure 12A:
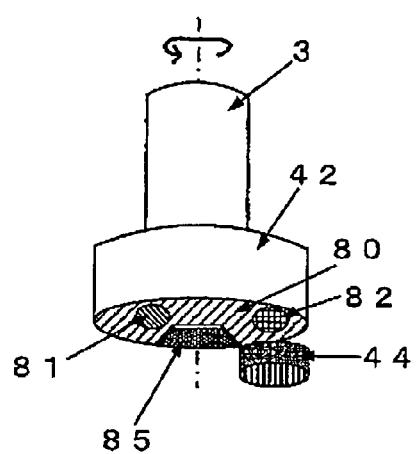
Figure 12B:
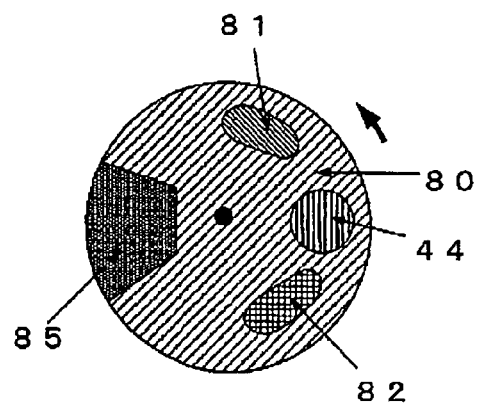

FIGS. 12A and 12B show a first example of modification of the aforementioned vacuum pump, wherein FIG. 12A is a perspective view of a nut 42 and a gap sensor 44, and FIG. 12B is a top plan view of the nut 42, when viewed from the side of the gap sensor 44. In the first example of modification, the nut 42 is formed with a convex segment 85 on a bottom surface thereof to detect a rotation synchronization signal, in addition to the target 80, 81, 82 illustrated in FIG. 2. The convex segment 85 is preferably made of the same pure iron as that for the nut 42. When a gap dimension between the bottom surface (target 80) of the nut 42 and the gap sensor 44 is set at 1 mm, a height dimension of the convex portion 85 is set at about 0.3 mm.

In a state when the convex segment 85 is in opposed relation to the gap sensor 44, the gap for the convex segment 85 is less than that for the target 80 by 0.3 mm, and thereby the convex segment 85, i.e., magnetic segment, comes closer to the gap sensor 44 to allow the inductance to be extremely sensitively increased. Thus, a signal detected during a period of time when the convex segment 85 is in opposed relation to the gap sensor 44 is used as a synchronization signal. This detection signal has a significantly large amplitude irrespective of a temperature of the convex segment 85. An amplitude signal to be obtained during 2×360-degree rotation is shown in FIG. 13.

Figure 13:
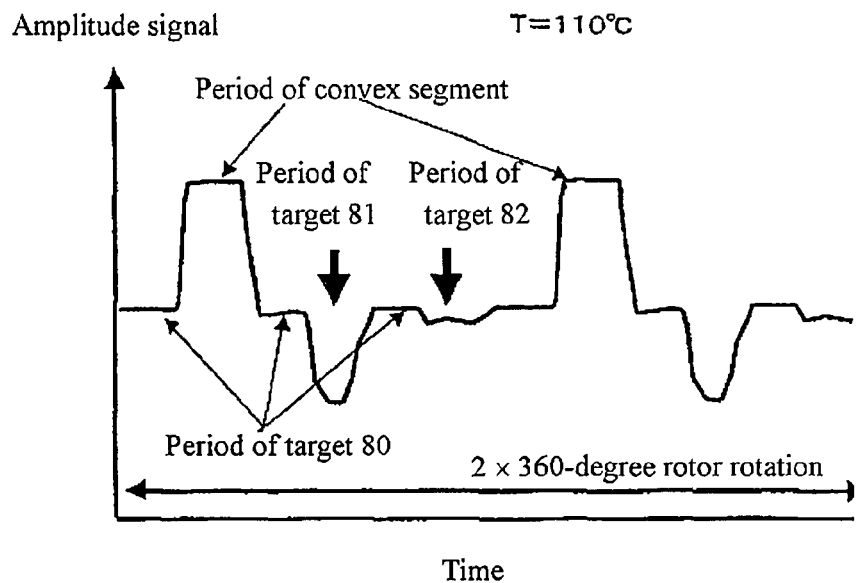
FIG. 13 is a graph showing an amplitude signal at a temperature T=110° C. in the first example of modification.

The signal illustrated in FIG. 13 is obtained under the condition of the temperature T=110° C. as with that in FIG. 8A. A detection signal during a period of time when each of the targets 80, 81, 82 is in opposed relation to the gap sensor 44 is the same as that illustrated in FIG. 8B. In contrast, during a period of time when the convex segment 85 is in opposed relation to the gap sensor 44, the inductance and the amplitude are increased because of the reduced gap dimension. Thus, the signal during this period can be used as the synchronization signal to allow the signals of the remaining targets 80 to 82 to be identifiably extracted individually. That is, both detections of rotational speed and temperature can be simultaneously performed using the single gap sensor 44.

In the first example of modification, the convex segment 85 is formed to generate the synchronization signal. Alternatively, a concave segment may be formed to achieve the same function. Further, a plurality of convex or concave segments may be formed to be rotated to respective positions each opposed to the gap sensor during a single rotation cycle, i.e., a 360-degree rotation. The formation of the convex or concave segment as a target for a rotation signal is equivalent to provide a magnetic segment having the same contribution to the inductance change as that of the convex or concave. In this case, the magnetic segment is required to have a Curie temperature sufficiently higher than the aforementioned allowable temperature (about 110~140° C.).

SECOND EXAMPLE OF MODIFICATION

Figure 14:
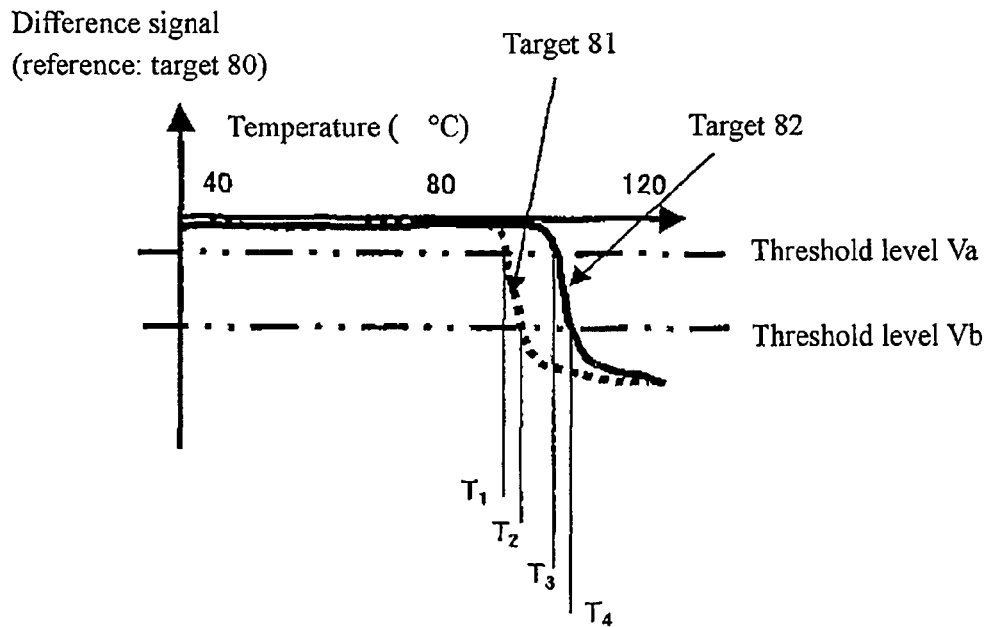
FIG. 14 is a graph for explaining a second example of modification, which shows respective difference signals of targets 81, 82.

FIG. 14 is a graph for explaining a second example of modification of the aforementioned vacuum pump, which shows respective difference signals of targets 81, 82. In the second example of modification, two different thresholds Va, Vb is set for these different signals. In this case, the comparator 63 in FIG. 5 may be provided in the same number (in this example, two) as that of the thresholds Va, Vb. Given that a temperature at which the difference signal of the target 81 becomes equal to the threshold Va is T1, and a temperature at which the difference signal of the target 81 becomes equal to the threshold Vb is T2. Further, given that a temperature at which the difference signal of the target 82 becomes equal to the threshold Va is T3, and a temperature at which the difference signal of the target 82 becomes equal to the threshold Vb is T4. Thus, in a temperature region around the allowable temperature (about 110~140° C.), the four different temperatures T1, T2, T3, T4 can be detected.

In the example illustrated in FIG. 14, two different Curie temperatures of the targets 81, 82 are used, and thereby two signals each sharply falling in a temperature region just above the Curie temperature can be formed to detect the four different temperatures T1, T2, T3, T4. The number of thresholds may be increased to three or more to increase the number of detectable temperatures.

As above, in the second example of modification, a plurality of thresholds can be set in a threshold settable range which is extended based on the technique using the difference signal, so as to more finely detect temperatures. This makes it possible to provide enhanced flexibility in operation of the turbo-molecular pump so as to allow the turbo-molecular pump to be effectively operated in security.

For example, when the temperature exceeds T1 in FIG. 14 or according to an accumulated value of a period of time when the temperature exceeds T1, the rotational speed of the pump may be controlled to be slightly lowered, automatically or manually. Further, when the temperature exceeds T2, or according to an accumulated value of a period of time when the temperature exceeds T2, the rotational speed of the pump may be controlled to be further lowered, automatically or manually. Furthermore, when the temperature exceeds T3, the pump may be controlled to be forcedly stopped. In this manner, the detection of the plurality of temperatures T1 to T4 makes it possible to perform a sophisticated rotation control which cannot be achieved by a technique of detecting temperature only at a single point.

THIRD EXAMPLE OF MODIFICATION

Figure 15:
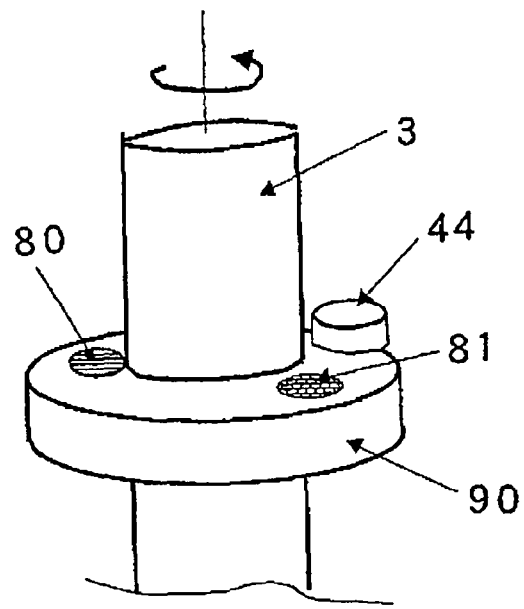
FIG. 15 is a schematic diagram showing a third example of modification.

FIG. 15 shows a third example of modification. In the embodiment illustrated in FIG. 2, the targets 80 to 82 are mounted in the pure-iron nut 42 fixed to the lower end of the shaft 3. The member for mounting the temperature-detecting magnetic segment (e.g., a ferrite material) therein may be a member made of a non-magnetic material, such as an aluminum material. The rotor blade 8 of the turbo-molecular pump is typically made of an aluminum material, and a technique of mounting a ferrite segment directly in the aluminum rotor blade can provide an advantage, in some cases.

The following description will be made about a structure designed to mount a target in an aluminum member. In FIG. 15, a ring 90 is adapted to be integrally rotated together with a shaft 3 having a rotor fixed thereto. The ring 90 corresponds, for example, to a portion of a rotor blade 8 to be attached to the shaft. The ring 90 has an upper surface mounting two targets 80, 81 therein. The target 80 is made of a magnetic material having a Curie temperature which is sufficiently higher than 120° C., and the target 81 is made of a ferrite material having a Curie temperature of about 120° C. A gap sensor 44 is fixed to a stator side, and disposed at a position opposable to these targets 80, 81.

As compared with the structure in FIG. 2, a feature of this example is that a signal of the aluminum ring 90 having a wider area appears during rotation of the rotor, and a size of the target 80 serving as the reference magnetic segment can be relatively reduced. The vacuum pump in the third example of modification can also obtain three levels of amplitudes during respective periods of time when the gap sensor 44 becomes opposed to the ring 90 and the targets 80, 81.

In this example, the aluminum material is a non-magnetic material. Thus, an amplitude during a period of time when the gap sensor 44 becomes opposed to the aluminum ring 90 is lowest, and a signal having a large amplitude appears in a pulsed manner. This make it relatively easy to detect temperature based on a threshold. As to the correction of a permeability change in a non-Curie temperature region (generation of a difference signal), in the third example of modification, the difference signal is generated using a signal of the target 80 which is a magnetic material, as the reference signal, instead of using a signal of the aluminum ring 90 as the reference signal.

Control of Pump Operation

A control for securely operating the turbo-molecular pump by utilizing the rotor-temperature monitor signal output from the detection section 31 will be described below. Specifically, the following description will be made based on a control using the target 80 (reference target) and the target 81.

CONTROL EXAMPLE 1

Control Example 1 shows the simplest control. If the rotor-temperature monitoring signal indicates that a temperature exceeds a Curie temperature, i.e., the target temperature (rotor temperature) T becomes equal to or greater than the Curie temperature Tc, the motor drive control section 33 operates to immediately lower the speed of the rotor 2 so as to stop the rotor 2. Then, the alarm section 34 operates to annunciate abnormality in the rotor temperature. Thus, when the rotor temperature T reaches the allowable temperature Tmax, and a significant creep deformation occurs, the rotor is stopped to present the creep deformation from being accelerated so as to provide enhanced reliability and security.

CONTROL EXAMPLE 2

In Control Example 1, when the rotor temperature T becomes equal to or greater than the Curie temperature Tc, the rotor is stopped. Alternatively, the rotor speed may be lowered only when the rotor temperature T is equal to or greater than the Curie temperature Tc, and returned to a rated value when the rotor temperature T becomes less than the Curie temperature Tc. In this manner, when the rotor temperature T becomes equal to or greater than the Curie temperature Tc, a creep deformation of the rotor 2 due to centrifugal force can be suppressed. If the rotor speed is lowered below the rated value, information about an abnormal increase in the rotor temperature is annunciated, and further information about a lowering of the rotor speed is indicated in the alarm section 24 to invite operator's attention.

In cases where the turbo-molecular pump is used with an etch apparatus, a reaction product is likely to attach onto the inside of the pump. The attachment of the reaction product is accelerated as the pump temperature is lower. Thus, the pump body is generally heated by a heater or the like to suppress the attachment. Thus, instead of or in addition to lowering the rotor speed, heating means, such as a heater, may be stopped only when the rotor temperature is equal to or greater than the Curie temperature Tc.

CONTROL EXAMPLE 3

In Control Examples 1, 2, when the rotor temperature T becomes equal to or greater than the Curie temperature Tc, the rotor is stopped, or the rotor speed is lowered only when the rotor temperature T is equal to or greater than the Curie temperature Tc. However, there is a possibility that the rotor speed cannot be changed, because a semiconductor manufacturing system is in the middle of processing. As one example of a control in such a situation, when an accumulated value of a period of time when the temperature exceeds T1 reaches a reference time-period, the rotor 2 is stopped, and the occurrence of abnormality is annunciated by the alarm section 34. Thus, even if the rotor temperature T becomes equal to or greater than the Curie temperature Tc, the processing can be continued as long as the accumulated value is less than the reference time-period.

The reference time-period is set at a time-period from a time when the rotor temperature T becomes equal to or greater than the Curie temperature Tc, through until an amount of creep deformation reaches an allowable value determined by an experimental test or simulation on rotor creep life. In this case, the level of creep deformation is varied depending on temperatures. Thus, for example, a time-period calculated on the assumption that the rotor temperature T is equal to the Curie temperature Tc, or a slightly shorter time-period adjusted on the safe side, may be used as the reference time-period.

While the pump illustrated in FIGS. 1 and 2 is designed to arrange the targets 80 to 82 at the edge of the shaft 3, the present invention may also be applied to a pump of a type in which a magnetic ring is arranged on an outer periphery of a rotor. Further, the present invention may be applied to not only a vacuum pump but also a temperature detection mechanism for a rotor.

In a correspondence between the above embodiment and elements of the appended claims, the gap sensor 44 and the direction section 31 constitute an inductance detection section, and the detection section 31 constitutes a temperature detection section and a rotation detection section. The targets 81, 82 constitute a first magnetic segment, and the target 80 constitutes a second magnetic segment. The convex segment 85 constitutes a third magnetic segment, and the difference-signal generation section 67, the division-signal generation circuit, and the division-difference signal generation circuit constitute a calculation signal generation device. The nut 42 constitutes a retainer member. It is understood that the above description has been presented by way of example, but the above correspondence between the description of the embodiment and elements of the appended claims is not meant to be construed in a limiting sense.

What is claimed is:

1. A vacuum pump designed to rotate a rotor relative to a stator so as to evacuate gas, comprising:
    a plurality of magnetic segments each disposed on said rotor at a position on a circumference having a center on a rotation axis of said rotor, said plurality of magnetic segments including a first magnetic segment having a Curie temperature falling within a temperature monitoring range of said rotor, and a second magnetic segment having a higher Curie temperature than an upper limit temperature of said temperature monitoring range;
    an inductance detection section disposed at a position opposable to said first and second magnetic segments in turn according to rotation of said rotor, and adapted to detect respective permeability changes of said first and second magnetic segments as inductance changes;
    a calculation-signal generation device generating a difference signal calculated based on a detection signal during a period of a time when said first magnetic segment is in opposed relation to said inductance detection section, and a detection signal during a period of time when said second magnetic segment is in opposed relation to said inductance detection section, the calculation-signal generation circuit including a wave detector circuit that detects the detection signals, a rectifier circuit that rectifies the detection signals, and a difference signal generation circuit that generates the difference signal based on a difference between the detected signals; and
    a temperature detection section for comparing a signal level of said calculation signal and a predetermined reference level to detect a temperature of said rotor.

2. The vacuum pump as defined in claim 1, wherein said temperature detection section is designed to compare the signal level of said calculation signal with a plurality of different reference levels to detect a plurality of temperatures.

3. The vacuum pump as defined in claim 2, wherein each of said first and second magnetic segments is formed in such a manner that a length in a direction along said circumference is two times or more greater than a length in a radial direction extending from the rotation axis of said rotor.

4. The vacuum pump as defined in claim 2, wherein said plurality of magnetic segments further includes a third magnetic segment having a higher Curie temperature than said upper limit temperature, wherein:
    each of said first to third magnetic segments is adapted to be rotated to a position opposed to said inductance detection section with a gap dimension therebetween which is set such that the gap dimension for said third magnetic segment is less or greater than that for each of said first and second magnetic segments; and
    said vacuum pump includes a rotation detection section for detecting a rotation cycle of said rotor based on a detection signal during a period of time when said third magnetic segment and said inductance detection section are in opposed relation to each other.

5. The vacuum pump as defined in claim 2, wherein said first magnetic segment is provided in a plurality number, said first magnetic segments are different in Curie temperature, and arranged along said circumference on said rotor.

6. The vacuum pump as defined in claim 2, wherein any one of said plurality of magnetic segments serves as a retainer member for retaining the remaining magnetic segments to fix them to said rotor.

7. The vacuum pump as defined in claim 2, which is designed to control the temperature of said rotor based on the detection result of said temperature detection section.

8. The vacuum pump as defined in claim 1, wherein said first magnetic segment is provided in a plurality number, said first magnetic segments are different in Curie temperature, and arranged along said circumference on said rotor.

9. The vacuum pump as defined in claim 1, which is designed to control the temperature of said rotor based on the detection result of said temperature detection section.

10. A vacuum pump designed to rotate a rotor relative to a stator so as to evacuate gas, comprising:
    a plurality of magnetic segments each disposed on said rotor at a position on a circumference having a center on a rotation axis of said rotor, said plurality of magnetic segments including a first magnetic segment having a Curie temperature falling within a temperature monitoring range of said rotor, and a second magnetic segment having a higher Curie temperature than an upper limit temperature of said temperature monitoring range;
    an inductance detection section disposed at a position opposable to said first and second magnetic segments in turn according to rotation of said rotor, and adapted to detect respective permeability changes of said first and second magnetic segments as inductance changes;
    a calculation-signal generation device generating a signal calculated based on a detection signal during a period of a time when said first magnetic segment is in opposed relation to said inductance detection section, and a detection signal during a period of time when said second magnetic segment is in opposed relation to said inductance detection section; and a temperature detection section for comparing a signal level of said calculation signal and a predetermined reference level to detect a temperature of said rotor, wherein each of said first and second magnetic segments is formed in such a manner that a length in a direction along said circumference is two times or more greater than a length in a radial direction extending from the rotation axis of said rotor.

11. The vacuum pump as defined in claim 10, wherein said plurality of magnetic segments further includes a third magnetic segment having a higher Curie temperature than said upper limit temperature, wherein:

each of said first to third magnetic segments is adapted to be rotated to a position opposed to said inductance detection section with a gap dimension therebetween which is set such that the gap dimension for said third magnetic segment is less or greater than that for each of said first and second magnetic segments; and said vacuum pump includes a rotation detection section for detecting a rotation cycle of said rotor based on a detection signal during a period of time when said third magnetic segment and said inductance detection section are in opposed relation to each other.

12. The vacuum pump as defined in claim 10, wherein said first magnetic segment is provided in a plurality number, said first magnetic segments are different in Curie temperature, and arranged along said circumference on said rotor.

13. The vacuum pump as defined in claim 10, wherein any one of said plurality of magnetic segments serves as a retainer member for retaining the remaining magnetic segments to fix them to said rotor.

14. The vacuum pump as defined in claim 10, which is designed to control the temperature of said rotor based on the detection result of said temperature detection section.

15. A vacuum pump designed to rotate a rotor relative to a stator so as to evacuate gas, comprising:

a plurality of magnetic segments each disposed on said rotor at a position on a circumference having a center on a rotation axis of said rotor, said plurality of magnetic segments including a first magnetic segment having a Curie temperature falling within a temperature monitoring range of said rotor, and a second magnetic segment having a higher Curie temperature than an upper limit temperature of said temperature monitoring range;

an inductance detection section disposed at a position opposable to said first and second magnetic segments in turn according to rotation of said rotor, and adapted to detect respective permeability changes of said first and second magnetic segments as inductance changes;

a calculation-signal generation device generating a signal calculated based on a detection signal during a period of a time when said first magnetic segment is in opposed relation to said inductance detection section, and a detection signal during a period of time when said second magnetic segment is in opposed relation to said inductance detection section; and a temperature detection section for comparing a signal level of said calculation signal and a predetermined reference level to detect a temperature of said rotor, wherein said plurality of magnetic segments further includes a third magnetic segment having a higher Curie temperature than said upper limit temperature, wherein:

each of said first to third magnetic segments is adapted to be rotated to a position opposed to said inductance detection section with a gap dimension therebetween which is set such that the gap dimension for said third magnetic segment is less or greater than that for each of said first and second magnetic segments; and said vacuum pump includes a rotation detection section for detecting a rotation cycle of said rotor based on a detection signal during a period of time when said third magnetic segment and said inductance detection section are in opposed relation to each other.

16. The vacuum pump as defined in claim 15, wherein said first magnetic segment is provided in a plurality number, said first magnetic segments are different in Curie temperature, and arranged along said circumference on said rotor.

17. The vacuum pump as defined in claim 15, wherein any one of said plurality of magnetic segments serves as a retainer member for retaining the remaining magnetic segments to fix them to said rotor.

18. The vacuum pump as defined in claim 15, which is designed to control the temperature of said rotor based on the detection result of said temperature detection section.

19. A vacuum pump designed to rotate a rotor relative to a stator so as to evacuate gas, comprising:

a plurality of magnetic segments each disposed on said rotor at a position on a circumference having a center on a rotation axis of said rotor, said plurality of magnetic segments including a first magnetic segment having a Curie temperature falling within a temperature monitoring range of said rotor, and a second magnetic segment having a higher Curie temperature than an upper limit temperature of said temperature monitoring range;

an inductance detection section disposed at a position opposable to said first and second magnetic segments in turn according to rotation of said rotor, and adapted to detect respective permeability changes of said first and second magnetic segments as inductance changes;

a calculation-signal generation device generating a signal calculated based on a detection signal during a period of a time when said first magnetic segment is in opposed relation to said inductance detection section, and a detection signal during a period of time when said second magnetic segment is in opposed relation to said inductance detection section; and a temperature detection section for comparing a signal level of said calculation signal and a predetermined reference level to detect a temperature of said rotor, wherein any one of said plurality of magnetic segments serves as a retainer member for retaining the remaining magnetic segments to fix them to said rotor.

* * * * *